(No Model.)
J. POWERS.
FIRE POT FOR BLACKSMITHS' FORGES.
No. 253,944. Patented Feb. 21, 1882.
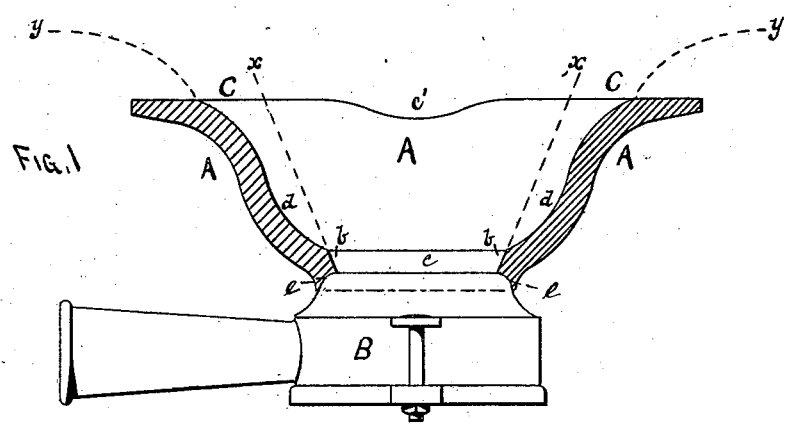
Fig. I
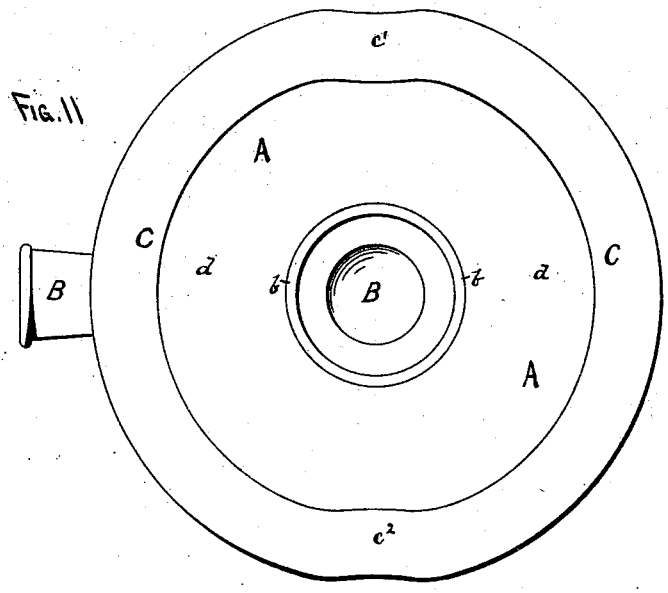
Fig. II
WITNESSES.
J. F. Orcutt
Edward Robert
John Powers,
INVENTOR, By
Louis Feeser
Chas. N. Woodward,
Attys.

UNITED STATES PATENT OFFICE.

JOHN POWERS, OF MURDOCK, MINNESOTA.

FIRE-POT FOR BLACKSMITHS' FORGES.

SPECIFICATION forming part of Letters Patent No. 253,944, dated February 21, 1882.

Application filed March 31, 1880. (No model.)

*To all whom it may concern:*

Be it known that I, JOHN POWERS, of Murdock, in the county of Swift and State of Minnesota, have invented a certain new and useful Improvement in Fire-Pots for Blacksmiths' Forges and the Like, of which the following is a full, clear, and exact description.

In the accompanying drawings, Figure I is a side elevation of the tuyere and pot, the latter being in section; and Fig. II is a plan of the same.

My invention relates to blacksmiths' and like forges; and it consists in the construction and combination of parts hereinafter particularly described, and then sought to be specifically defined by the claim.

In the accompanying drawings, the letter B indicates the tuyere, which is open at its top, so that it may be adapted to receive a revolving ball or globe grate, whereby the cinders may be let down and out of the pot without putting out the fire, and it is also made with a rounded top, as shown, so that the pot may be fitted more closely thereto; but as I do not intend to lay any claim to the construction of the tuyere, but only to the construction of the pot, I will not go into the details of construction of the tuyere.

The pot to which my invention particularly relates is indicated by the letter A. It is made separate from the tuyere, and is constructed with a recess, *e*, around the central opening, *c*, so that the pot may be snugly and securely fitted to the top of the tuyere, as shown, and the central opening, *c*, is provided with flaring or inclined walls *b*, in order that the flame may be directed in the line indicated by the dotted lines *x*, whereby the blast is directed throughout the center of the pot, and the heat there concentrated. The central opening and vertical or inclined walls thereto also permit the use of the globular revolving grate, already referred to, without interference with the function of the walls from the use of the grate. The inside walls of the pot, from the top edge of the wall to the central opening, *c*, curve outward, so as to form a concave or recessed side wall, *d*, to the pot, which recess is filled with ashes, whereby the wall is protected from the hot blast from the tuyere.

By constructing the pot, as described, separate from the tuyere, and with the central opening, *c*, having a flaring wall, *b*, and a recess, *e*, beneath and around the same, the pot can be applied to any form of tuyere that the blacksmith may prefer to use, and when one pot is burned out another may be readily substituted therefor and snugly fitted to the old tuyere, which may still be used. The revolving grate can be used, whereby the cinders may be dropped without extinguishing the fire. The blast will be directed by the walls of the central opening, and the pot will wear longer.

I lay no claim broadly to any of the features herein described; and I am aware that a blacksmith's forge has been patented which shows the pot made in one piece with the tuyere, the pot having a curved bottom with perforations for the passage of the blast from the tuyere, and also side walls which form nearly two arcs of circles, and extend out as they rise into a plate which forms a part of the hearth of the forge; but, Having described my invention, what I claim is—

In a blacksmith's forge, a fire-pot therefor made separate from the tuyere, and constructed with a central opening, *c*, having a wall, *b*, directing the blast, as described, a concave wall, *d*, to the pot, diverging from the top of the wall of central opening, *c*, and a recess, *e*, about and below the opening *c*, so as to adapt the pot to be snugly fitted to the tuyere, all substantially as and for the purpose set forth.

In testimony whereof I have hereunto set my hand in the presence of two subscribing witnesses.

JOHN POWERS.

Witnesses:
C. N. WOODWARD,
LOUIS FEESER.